United States Patent
Kwatra et al.

(10) Patent No.: US 11,921,808 B2
(45) Date of Patent: Mar. 5, 2024

(54) AUTO-EVOLVING OF ONLINE POSTING BASED ON ANALYZED DISCUSSION THREAD

(71) Applicant: INTERNATIONAL BUSINESS MACHINES CORPORATION, Armonk, NY (US)

(72) Inventors: Shikhar Kwatra, Raleigh, NC (US); Paul Krystek, Highland, NY (US); John D. Wilson, League City, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 16/947,454

(22) Filed: Aug. 3, 2020

(65) Prior Publication Data

US 2022/0035884 A1  Feb. 3, 2022

(51) Int. Cl.
*G06F 7/00* (2006.01)
*G06F 16/9536* (2019.01)
*G06F 16/955* (2019.01)
*G06N 5/04* (2023.01)
*G06N 20/00* (2019.01)

(52) U.S. Cl.
CPC ...... *G06F 16/9558* (2019.01); *G06F 16/9536* (2019.01); *G06N 5/04* (2013.01); *G06N 20/00* (2019.01)

(58) Field of Classification Search
CPC . G06F 16/9558; G06F 16/9536; G06N 20/00; G06N 5/04; G06N 7/01; G06N 3/006; G06N 20/20

USPC ................................ 707/776, 802, 803, 810
See application file for complete search history.

(56) References Cited

U.S. PATENT DOCUMENTS

| | | |
|---|---|---|
| 7,613,769 B1 | 11/2009 | Hess |
| 11,200,284 B1* | 12/2021 | Li ....................... G06K 9/6223 |
| 2008/0215607 A1 | 9/2008 | Kaushansky |
| 2009/0254529 A1* | 10/2009 | Goldentouch ...... G06F 16/9535 |
| 2010/0318619 A1 | 12/2010 | Meijer |
| 2011/0246463 A1 | 10/2011 | Carson, Jr. |
| 2012/0117475 A1 | 5/2012 | Lee |
| 2012/0210247 A1 | 8/2012 | Khouri |
| 2016/0164985 A1 | 6/2016 | Song et al. |
| 2016/0314113 A1* | 10/2016 | Moharrami ............. G06F 40/30 |

(Continued)

OTHER PUBLICATIONS

Mell, et al., "The NIST Definition of Cloud Computing", National Institute of Standards and Technology, Special Publication 800-145, Sep. 2011, 7 pages.

*Primary Examiner* — Md I Uddin
(74) *Attorney, Agent, or Firm* — Jordan T. Schiller

(57) ABSTRACT

A method, computer system, and a computer program product for online posting annotation is provided. The present invention may include identifying a topic in an online posting. The present invention may include determining that a comment to the online posting relates to the online posting. The present invention may include adding at least one detail from the comment to the online posting. The present invention may include tagging the at least one added detail with at least one piece of metadata. The present invention may include validating a viewing access based on the at least one piece of metadata and displaying an amended online posting.

20 Claims, 5 Drawing Sheets

(56) References Cited

U.S. PATENT DOCUMENTS

| | | | |
|---|---|---|---|
| 2017/0034107 A1* | 2/2017 | Krishnaswamy | G06F 40/30 |
| 2017/0220580 A1 | 8/2017 | Chi | |
| 2019/0187955 A1 | 6/2019 | Green | |
| 2020/0133662 A1* | 4/2020 | Smith | G06F 9/54 |
| 2021/0304151 A1* | 9/2021 | Wadhwa | G06Q 10/1053 |

* cited by examiner

US 11,921,808 B2

AUTO-EVOLVING OF ONLINE POSTING BASED ON ANALYZED DISCUSSION THREAD

BACKGROUND

The present invention relates generally to the field of computing, and more particularly to analytics and optimization.

Content posted to a social networking site by a user may invite social connections and/or friends of the user who view the posted content to ask various questions about the posted content and/or to discuss the posted content in a conversational comment and/or a comment thread. The user may provide answers and/or responses to the various questions and/or comments. The social connections and/or friends of the user may ask additional questions pertaining to the posted content based on the user's provided answers and/or responses. Social connections and/or friends of the user may also post additional information pertaining to the posted content.

SUMMARY

Embodiments of the present invention disclose a method, computer system, and a computer program product for online posting annotation. The present invention may include identifying a topic in an online posting. The present invention may include determining that a comment to the online posting relates to the online posting. The present invention may include adding at least one detail from the comment to the online posting. The present invention may include tagging the at least one added detail with at least one piece of metadata. The present invention may include validating a viewing access based on the at least one piece of metadata and displaying an amended online posting.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
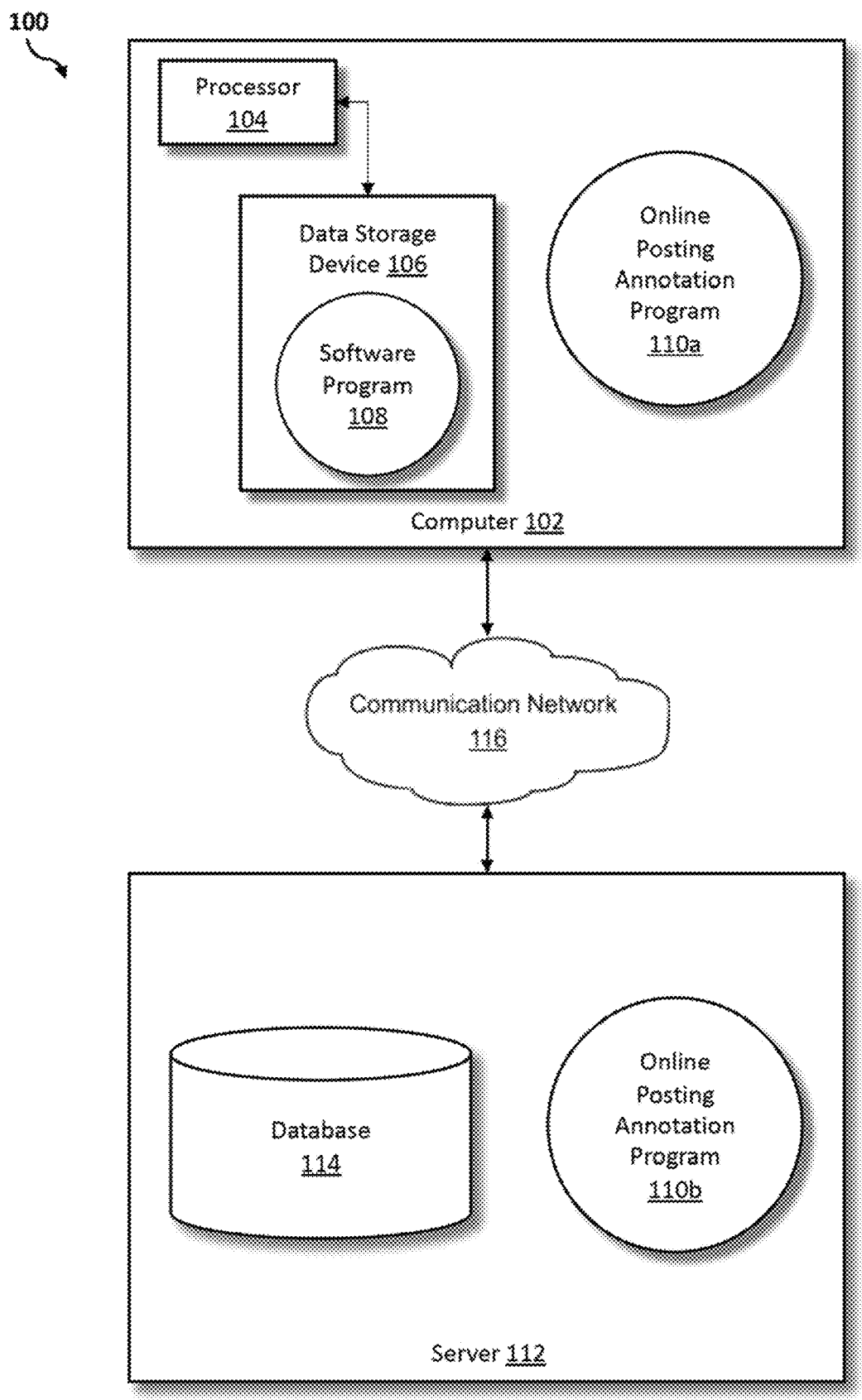
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for online posting annotation. As such, the present embodiment has the capacity to improve the technical field of analytics and optimization by annotating an online posting on a social networking site based on additional details, which relate to the online posting, but which have been provided in comments and/or questions to the online posting, and restricting viewing access of the annotated online posting based on a controlled security model. More specifically, the present invention may include identifying a topic in an online posting. The present invention may include determining that a comment to the online posting relates to the online posting. The present invention may include adding at least one detail from the comment to the online posting. The present invention may include tagging the at least one added detail with at least one piece of metadata. The present invention may include validating a viewing access based on the at least one piece of metadata and displaying an amended online posting.

As described previously, content posted to a social networking site by a user may invite social connections and/or friends of the user who view the posted content to ask various questions about the posted content and/or to discuss the posted content in a conversational comment and/or a comment thread. The user may provide answers and/or responses to the various questions and/or comments. The social connections and/or friends of the user may ask additional questions pertaining to the posted content based on the user's provided answers and/or responses. Social connections and/or friends of the user may also post additional information pertaining to the posted content.

However, the inclusion of additional information may require social connections and/or friends of the user to read the posted content along with the entire conversation thread in order to understand the nuanced details of the posted content and the corresponding discussion. A reader of the posted content may unknowingly ask a question which has already been asked by another user, but which has been buried within the conversation thread.

Therefore, it may be advantageous to, among other things, identify and summarize contents from the conversation thread, including but not limited to comments and questions, and to create a new summary posting and/or to update the original posted content based on additional information included in the conversation thread.

According to at least one embodiment, the present invention may create a new summary posting and/or may update an original posted content to enable a user to ascertain details of a conversational comment thread in a single online posting.

According to at least one embodiment, an online posting may be annotated with relevant summary information derived from comments and/or questions of social connections and/or friends.

According to at least one embodiment, the viewing of additional comments in an annotated online posting may be controlled and/or dynamically modified by a security model via learned and/or defined preferences.

According to at least one embodiment, an online posting may be annotated by analyzing comments and/or related online postings to simplify the process of updating social connections and/or friends with relevant content and/or by responding to questions and/or comments where a trivial inquiry is being made.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an online posting annotation program 110a. The networked computer environment 100 may also include a server 112 that is enabled to run an online posting annotation program 110b that may interact with a database 114 (e.g., a blacklist database, among other databases) and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the online posting annotation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the online posting annotation program 110a, 110b (respectively) to annotate an online posting on a social networking site based on additional details, which relate to the online posting, but which have been provided in comments and/or questions to the online posting, and restricting viewing access of the annotated online posting based on a controlled security model. The online posting annotation method is explained in more detail below with respect to FIG. 2.

Figure 2:
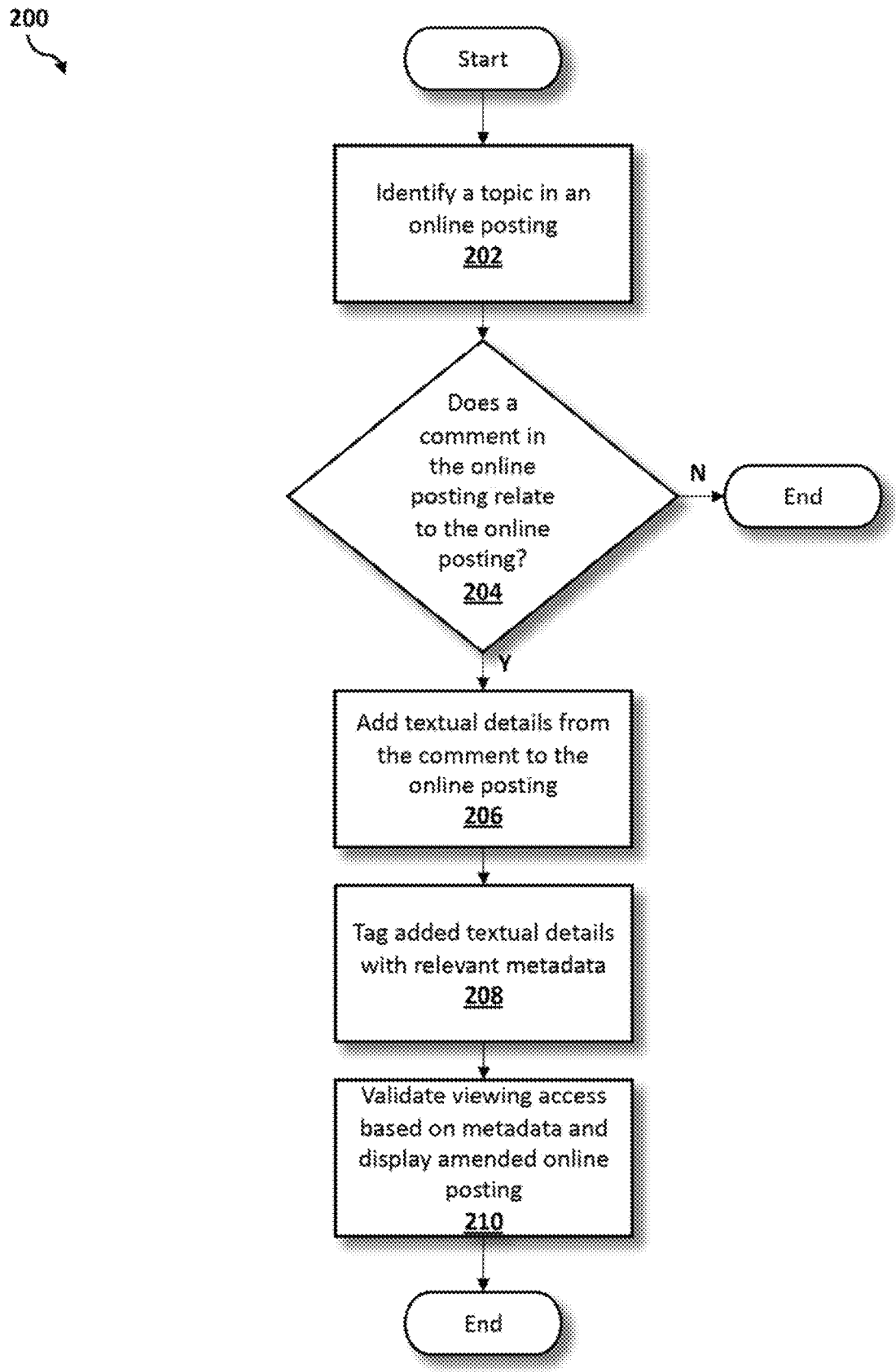
FIG. 2 is an operational flowchart illustrating a process for online posting annotation according to at least one embodiment.

Referring now to FIG. 2, an operational flowchart illustrating the exemplary online posting annotation process 200 used by the online posting annotation program 110a and 110b according to at least one embodiment is depicted.

At 202, a topic is identified in an online posting. An online posting may be a written, audio, and/or visual posting (e.g., a photograph and/or video) which may be posted on any online platform (i.e., social networking site) that supports threading. A topic may be identified by a server of a social networking site, and/or a client running inside a server, among other things, when the online posting is posted to the social networking site. The online posting may be stored in a repository of online postings and an application programming interface (API) request may be sent to the server to retrieve the online posting.

Natural language processing (NLP) and semantic understanding techniques may be used to identify the topic of the online posting. For audio and/or video online postings a speech to text converter may be integrated here to convert the analyzed sounds to text using algorithms which find the most probable word fit given the originating language of the audio and/or video. Topical information included in the online posting may be identified using contextual analysis via latent Dirichlet allocation (LDA), a generative statistical model in natural language processing (NLP) that may enable sets of observations to be mapped to dynamic topics when the language patterns are similar. LDA may be a method which enables the identification of topics within documents and which maps documents to the identified topics. When data in an online posting is analyzed, as here, by the online posting annotation program 110a, 110b, the mapped text may be classified into dynamic topics. The server may use the topic, as well as any identified comments and/or questions posted by social connections and/or friends on the online posting, to train a predictive classifier model.

The predictive classifier model may be an ensemble model (e.g., one which uses more than one base model and which aggregates the results of each base model into a final result) which, in conjunction with LDA, uses named entity recognition (NER) for text analysis. For example, unstructured text may be fed into a predictive classifier model using LDA and NER to extract keywords and entities, and the predictive classifier model may be trained based on the extracted keywords and entities.

Inputs (e.g., entities) extracted using NLP may be used as input to train the predictive classifier model, which may continuously take into account information from the online posting, and may expand on an identified topic based on the extracted inputs, until a threshold may be reached which indicates that all information regarding the online posting has been included in an amendment to the online posting (i.e., an amended online posting), as will be described in more detail below with respect to step 206.

At 204, the online posting annotation program 110a, 110b determines that a comment in the online posting relates to the content of the online posting. The comment may be a written, audio, and/or visual comment (e.g., a photograph and/or video) which may be posted on the online platform (i.e., social networking site) that supports threading. For example, a comment may include one or more video clips and/or photographs which may be shared within a discussion thread. By identifying both the topic of the online posting and the topic of the comments and/or questions posted by social connections and/or friends, as described previously with respect to step 202 above, the server of the social networking site may further determine whether the comments and/or questions relate to the topic of the online posting.

The online posting annotation program 110a, 110b may use text analysis techniques, including, but not limited to, text categorization (e.g., assigning a set of predefined categories to unstructured text), semantic similarity, and sentiment analysis, to establish a correlation between the comments and/or questions and the content of the online posting. For example, a sentiment analysis application programming interface (API) may determine whether the text expresses a sentiment which is temperamental, angry, disappointed, sad, or happy, among other things.

Furthermore, additional information may be identified within the comments and/or questions. For example, stemming of semantic content may be done using at least one dictionary mapping and an extension library within a python processing method, among other extension libraries and/or programming languages.

The online posting annotation program 110a, 110b may determine that a portion of the comment (e.g., which may include a question, among other things) semantically and/or contextually links to the original content of the online posting, and may similarly determine that at least one other portion of the comment includes new and/or dissimilar information (i.e., additional content, an added detail). The online posting may be annotated with the additional content (i.e., the added detail) derived from the comment. A relatedness of the additional content (i.e., the added detail) may be determined based on a cosine similarity (e.g., a relevance factor).

Cosine similarity may be used to calculate a positive or negative correlation between the content included in a comment to the online posting (i.e., the additional content, the added detail) and the online posting. Content from a comment to the online posting, which is determined to have a negative correlation (i.e., a negative cosine similarity), may not be included in the amended online posting as the content may not be related to the online posting.

Similarly, a cosine similarity may be used to calculate a positive or negative correlation between an added detail (i.e., additional content) included in a comment to an amended online posting and the amended online posting (e.g., in instances where the online posting has been amended).

To compute the cosine similarity, text from the online posting and/or a comment to the online posting may be converted into a numerical vector which may be plotted on a Cartesian coordinate system (e.g., an [x, y] axis). When the angle on a plotted coordinate set (e.g., the Cartesian coordinate system) is in a negative direction, and/or when the text represented by the numerical vector is close to 0, the text represented by the numerical vector may be determined to not be related to the online posting. Similarly, when the text represented by the numerical vector is close to 1, the text represented by the numerical vector may be determined to be related to the online posting.

If the online posting annotation program 110a, 110b determines that a comment in the online posting does not relate to the content of the online posting, then the program ends and the online posting may not be amended with the added detail (i.e., the additional content).

At 206, textual details from the comment are added to the online posting. The server of the social networking site may automatically edit the online posting to add content from a comment to the online posting based on a default security model and/or a set of preferences defined by a user of the online posting annotation program 110a, 110b in a configurable portion of the predictive classifier model.

The relative position of the contents derived from the comment and/or question may be arranged in such a way that there is no discontinuity between information included in the amended online posting (formerly the online posting), and further that the contextual meaning and semantics of the content of the amended online posting is maintained.

An identified topic may be expanded upon here, by adding to the online posting based on extracted inputs, as described previously with respect to step 202 above, until a threshold (i.e., a relatedness threshold) may be reached which indicates that all information regarding the online posting has been included in the amended online posting. The online posting annotation program 110a, 110b may use reinforcement learning (e.g., feedback provided by a user) to determine whether to add in content included in a comment to the online posting.

The online posting annotation program 110a, 110b may also use a cosine similarity (as described previously with respect to step 204 above) to assist in determining a threshold (e.g., to determine that all information relevant to the online posting has been gathered and added to an amended online posting).

For example, the server of a social networking site may analyze a conversation thread associated with an online posting on the social networking site to identify contents included within a comment and/or question on the online posting which relate to the content of the online posting. The online posting may read, "Last week we visited London, enjoyed the entire day, and had an amazing meal." Social connections and/or friends of the user may begin a conversation thread, including asking the user who he/she is traveling with, how many nights he/she will be in London, whether any other cities will be visited, and/or the total duration of the trip. The user may respond to the conversation thread and indicate that five friends are traveling together from London to Bath and that they've booked a car to drive the distance. The online posting annotation program 110a, 110b may identify that the additional information included in the comments and/or questions relates to the online posting and may amend (i.e., evolve) the online posting to add the related content. The amended online posting (formerly the online posting) may read, "Last week we visited London, enjoyed the entire day, and had an amazing meal. We booked a vehicle to go from London to Bath and are traveling with five friends." Photographs and video clips shared in response to comments and/or questions on the online posting, which have been determined to be related to the content of the online posting, have also be added with the amended content.

At 208, the added textual details are tagged with relevant metadata. The added textual details may be tagged with metadata which may include, but is not limited to including, attribution information (e.g., to determine whether a viewing security model for the social networking site can restrict the viewing based on the user's security configurations, as will be described in more detail with respect to step 210 below).

A comment made by a social connection and/or a friend may be incorporated into the online posting and the added textual details may be tagged with metadata which may indicate who the comment derived from.

The online posting annotation program 110a, 110b may also permit a user to hover over an amended online posting to view the name and/or identification information of a social connection and/or friend who provided the additional content. The online posting annotation program 110a, 110b may default to permitting the owner of the online posting (e.g., the user who posted the online posting) to view the name and/or identification information, but may permit the poster of the online posting to determine whether to make the name and/or identification information public and shareable with other users of the online platform (i.e., social networking site), assuming the other users' privacy settings support the sharing of this information.

At 210, viewing access is validated based on the tagged metadata and the amended online posting is displayed. The viewing of an amended online posting may be validated based on one or more predefined access rights. Social connections and/or friends may view an amended (i.e., evolved) online posting based on the predefined access rights.

If a security configuration of the social connection and/or the friend specifies that a particular user (i.e., a social connection or friend) is on a blacklist (e.g., a name and identification details of the social connection are included in a blacklist database) with respect to viewing his/her comments, then the blacklisted user may not view any added textual details that originated from the social connection and/or friend.

Additionally, based on the type and strength of the social networking relationship (e.g., spouses, family, distant friends with no prior interaction history, among other things), the content of the amended online posting may have evolved (i.e., been amended) in a personalized manner so as to appear differently to different social networking connections depending on the strength and nature of the relationship.

Continuing with the above example, the user's parents are listed as connections on the social networking site used to make the online posting. The predefined access rights, configured by the user within an interface for the online posting annotation program 110a, 110b, indicate that the user's parents cannot view posts that are not directed specifically to them. Here, since the post is made generally on the user's page, the user's parents can view the original posting, but may not be able to view some of the specific amended comments made in response to other users. The amended online posting (formerly the online posting) may appear different to each user based on a relationship type, a relationship strength, and a profile of the social networking connection.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
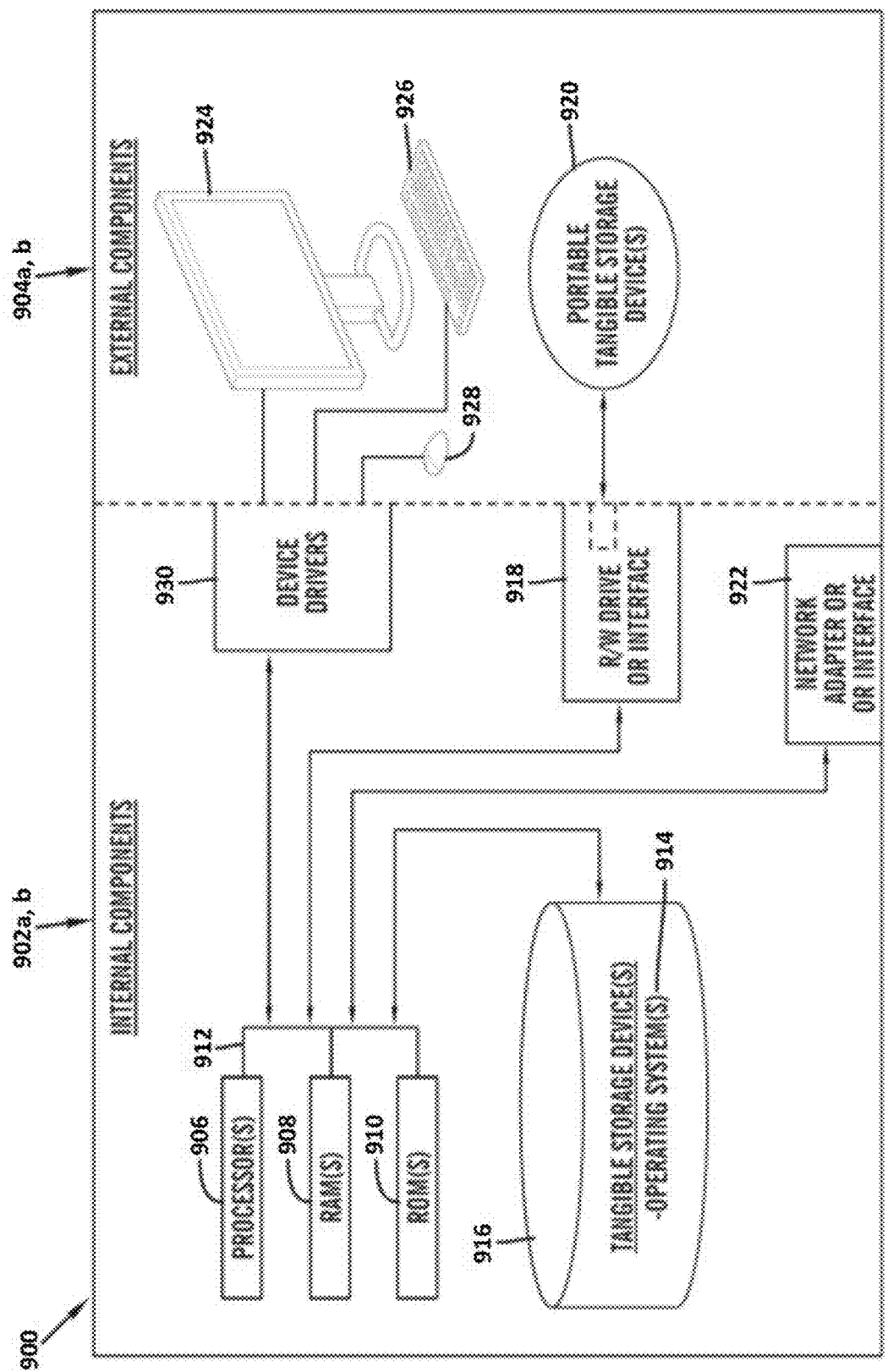
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the online posting annotation program 110a in client computer 102, and the online posting annotation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the online posting annotation program 110a and 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the online posting annotation program 110a in client computer 102 and the online posting annotation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the online posting annotation program 110a in client computer 102 and the online posting annotation program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
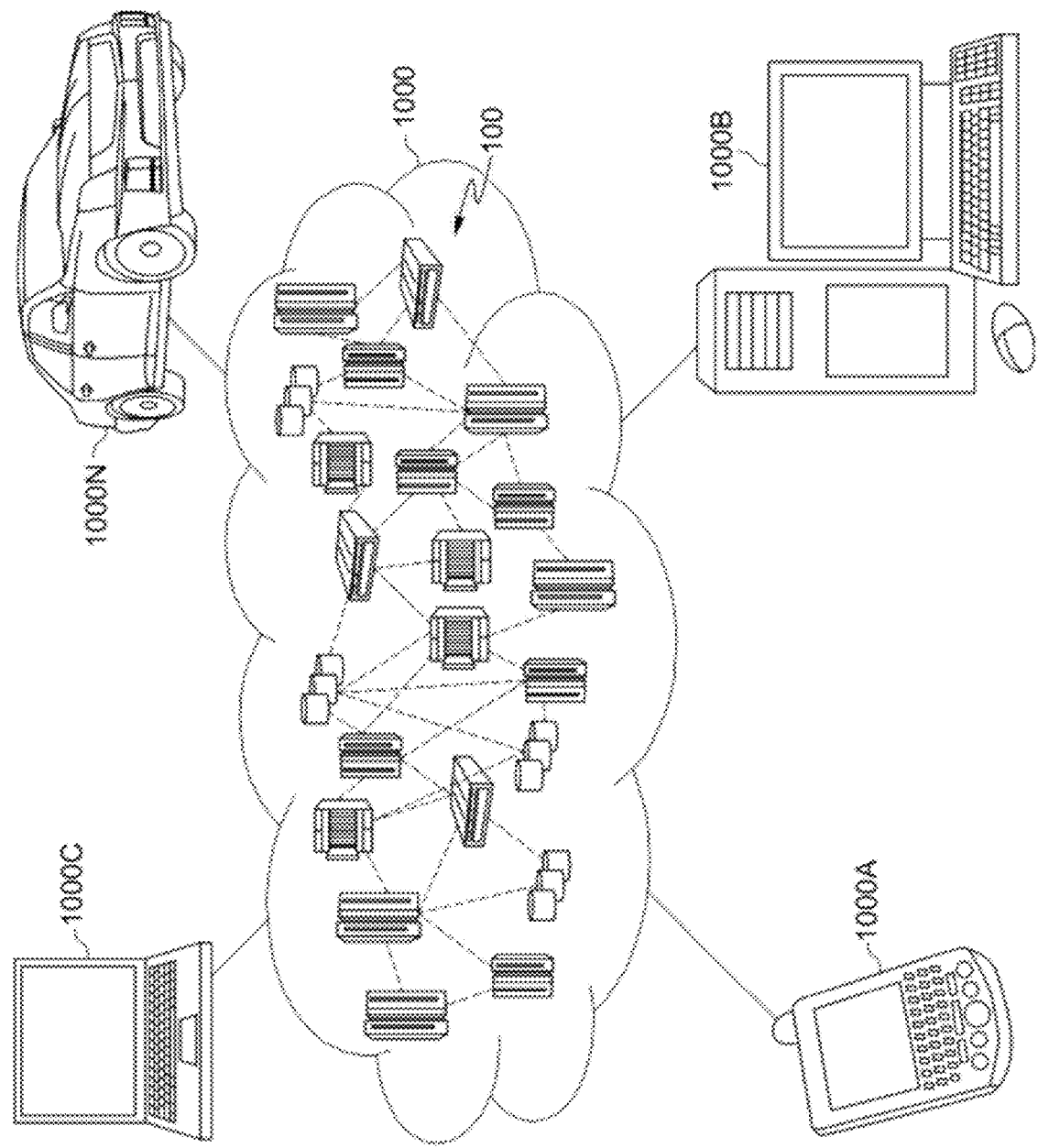
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
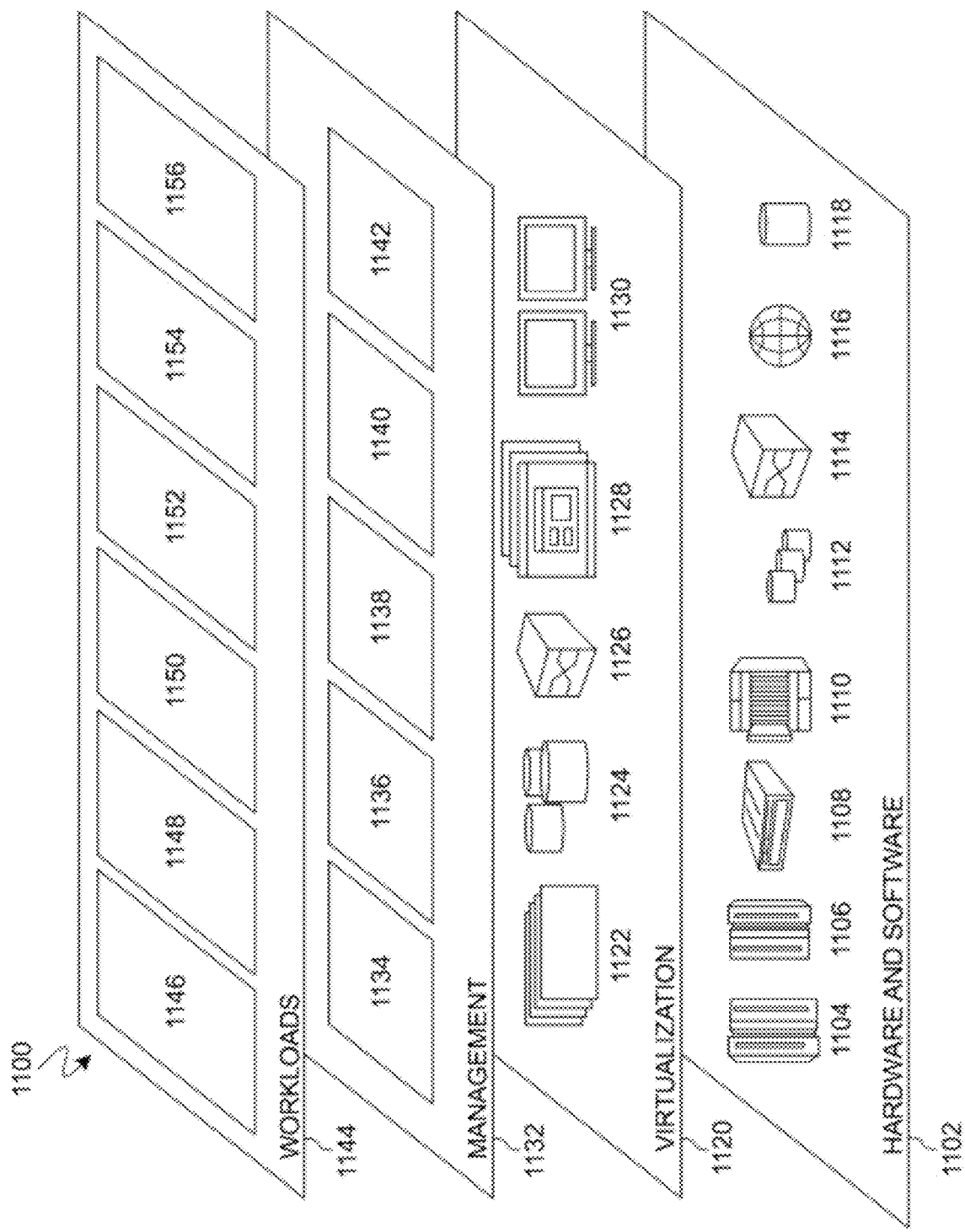
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and online posting annotation 1156. An online posting annotation program 110a, 110b provides a way to annotate an online posting on a social networking site based on additional details, which relate to the online posting, but which have been provided in comments and/or questions to the online posting, and restricting viewing access of the annotated online posting based on a controlled security model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for online posting annotation, the method comprising:
   identifying a topic in an online posting using an ensemble model consisting of more than one base model, wherein at least one of the more than one base model utilizes natural language processing (NLP) and semantic understanding techniques, and wherein the ensemble model aggregates a result of each of the more than one base model into a final result;
   summarizing contents from a conversation thread of the online posting, wherein the contents comprise one or more comments and questions;
   determining that the one or more comments and questions to the online posting relates to the identified topic of the online posting using at least text analysis techniques to establish a correlation between the comment and the online posting;
   updating the online posting based on additional information from the conversation thread;
   amending, dynamically, at least one detail from the one or more comments and questions to the identified topic of the online posting until a threshold is reached which indicates that all information regarding the online posting has been included in an amendment to the online posting;
   tagging the at least one added detail with at least one piece of metadata;
   validating a viewing access based on the at least one piece of metadata;
   viewing dynamically appended content to the online posting, based on relationship type, strength, and profile of friend to user who posted the online posting; and
   displaying an amended online posting.

2. The method of claim 1, wherein the at least one added detail is selected from the group consisting of a written detail, an audio detail, and a visual detail.

3. The method of claim 1, wherein identifying the topic in the online posting further comprises:
   using latent Dirichlet allocation (LDA) and named entity recognition (NER) to extract one or more keywords and one or more entities from unstructured text, wherein the one or more keywords and one or more entities are used to train a predictive classifier model, wherein the predictive classifier model is the ensemble model.

4. The method of claim 1, wherein determining that the one or more comments and questions to the online posting relates to the online posting further comprises:
   calculating a cosine similarity of the online posting and the one or more comments and questions to the online posting by converting the online posting and the one or more comments and questions to the online posting to numerical vectors and by plotting the numerical vectors on a Cartesian coordinate system, wherein the plotted vectors approach 1.

5. The method of claim 1, wherein adding the at least one detail from the one or more comments and questions to the online posting further comprises:
   using cosine similarity to determine that a relatedness threshold has not been reached by continuously taking into account information from the online posting and expanding on the identified topic using one or more extracted keywords and entities.

6. The method of claim 1, wherein tagging the at least one added detail with at least one piece of metadata further comprises:
   displaying attribution information of the at least one added detail to an amended online posting.

7. The method of claim 1, wherein validating the viewing access based on the at least one piece of metadata further comprises:
   identifying a list of people who do not have access;
   determining that a social connection is not on the list of people who do not have access; and
   displaying the amended online posting to the social connection.

8. A computer system for online posting annotation, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying a topic in an online posting using an ensemble model consisting of more than one base model, wherein at least one of the more than one base model utilizes natural language processing (NLP) and semantic understanding techniques, and wherein the ensemble model aggregates a result of each of the more than one base model into a final result;
summarizing contents from a conversation thread of the online posting, wherein the contents comprise one or more comments and questions;
determining that the one or more comments and quetisons to the online posting relates to the identified topic of the online posting using at least text analysis techniques to establish a correlation between the comment and the online posting;
updating the online posting based on additional information from the conversation thread;
amending, dynamically, at least one detail from the one or more comments and questions to the identified topic of the online posting until a threshold is reached which indicates that all information regarding the online posting has been included in an amendment to the online posting;
tagging the at least one added detail with at least one piece of metadata;
validating a viewing access based on the at least one piece of metadata;
viewing dynamically appended content to the online posting, based on relationship type, strength, and profile of friend to user who posted the online posting; and
displaying an amended online posting.

9. The computer system of claim 8, wherein the at least one added detail is selected from the group consisting of a written detail, an audio detail, and a visual detail.

10. The computer system of claim 8, wherein identifying the topic in the online posting further comprises:
using latent Dirichlet allocation (LDA) and named entity recognition (NER) to extract one or more keywords and one or more entities from unstructured text, wherein the one or more keywords and one or more entities are used to train a predictive classifier model, wherein the predictive classifier model is the ensemble model.

11. The computer system of claim 8, wherein determining that the one or more comments and questions to the online posting relates to the online posting further comprises:
calculating a cosine similarity of the online posting and the one or more comments and questions to the online posting by converting the online posting and the one or more comments and questions to the online posting to numerical vectors and by plotting the numerical vectors on a Cartesian coordinate system, wherein the plotted vectors approach 1.

12. The computer system of claim 8, wherein adding the at least one detail from the one or more comments and questions to the online posting further comprises:
using cosine similarity to determine that a relatedness threshold has not been reached by continuously taking into account information from the online posting and expanding on the identified topic using one or more extracted keywords and entities.

13. The computer system of claim 8, wherein tagging the at least one added detail with at least one piece of metadata further comprises:
displaying attribution information of the at least one added detail to an amended online posting.

14. The computer system of claim 8, wherein validating the viewing access based on the at least one piece of metadata further comprises:
identifying a list of people who do not have access;
determining that a social connection is not on the list of people who do not have access; and
displaying the amended online posting to the social connection.

15. A computer program product for online posting annotation, comprising:
one or more non-transitory computer-readable storage media and program instructions stored on at least one of the one or more tangible storage media, the program instructions executable by a processor to cause the processor to perform a method comprising:
identifying a topic in an online posting using an ensemble model consisting of more than one base model, wherein at least one of the more than one base model utilizes natural language processing (NLP) and semantic understanding techniques, and wherein the ensemble model aggregates a result of each of the more than one base model into a final result;
summarizing contents from a conversation thread of the online posting, wherein the contents comprise one or more comments and questions;
determining that the one or more comments and quetisons to the online posting relates to the identified topic of the online posting using at least text analysis techniques to establish a correlation between the comment and the online posting;
updating the online posting based on additional information from the conversation thread;
amending, dynamically, at least one detail from the one or more comments and questions to the identified topic of the online posting until a threshold is reached which indicates that all information regarding the online posting has been included in an amendment to the online posting;
tagging the at least one added detail with at least one piece of metadata;
validating a viewing access based on the at least one piece of metadata;
viewing dynamically appended content to the online posting, based on relationship type, strength, and profile of friend to user who posted the online posting; and
displaying an amended online posting.

16. The computer program product of claim 15, wherein identifying the topic in the online posting further comprises:
using latent Dirichlet allocation (LDA) and named entity recognition (NER) to extract one or more keywords and one or more entities, wherein the one or more keywords and one or more entities are used to train a predictive classifier model, wherein the predictive classifier model is the ensemble model.

17. The computer program product of claim 15, wherein determining that the one or more comments and questions to the online posting relates to the online posting further comprises:
calculating a cosine similarity of the online posting and the one or more comments and questions to the online posting by converting the online posting and the one or more comments and questions to the online posting to numerical vectors and by plotting the numerical vectors on a Cartesian coordinate system, wherein the plotted vectors approach 1.

18. The computer program product of claim 15, wherein adding the at least one detail from the one or more comments and questions to the online posting further comprises:

using cosine similarity to determine that a relatedness threshold has not been reached by continuously taking into account information from the online posting and expanding on the identified topic using one or more extracted keywords and entities.

19. The computer program product of claim 15, wherein tagging the at least one added detail with at least one piece of metadata further comprises:

displaying attribution information of the at least one added detail to an amended online posting.

20. The computer program product of claim 15, wherein validating the viewing access based on the at least one piece of metadata further comprises:

identifying a list of people who do not have access;
determining that a social connection is not on the list of people who do not have access; and
displaying the amended online posting to the social connection.

\* \* \* \* \*